May 28, 1968 R. C. BRADFORD ET AL 3,384,954

MAKING MULTITRACK MAGNETIC TRANSDUCER

Filed Dec. 7, 1965

INVENTORS
REX C. BRADFORD
HENRY R. KELSOF

BY Robert W. Ely
ATTORNEY

United States Patent Office 3,384,954
Patented May 28, 1968

3,384,954

MAKING MULTITRACK MAGNETIC TRANSDUCER

Rex C. Bradford, Louisville, Colo., and Henry R. Kelsof, Wappingers Falls, N.Y., assignors to International Business Machines Corporation, Armonk, N.Y., a corporation of New York Filed Dec. 7, 1965, Ser. No. 512,075
9 Claims. (Cl. 29—603)

ABSTRACT OF THE DISCLOSURE

A method for manufacturing a multitrack tape head including forming a blank having a plurality of wider-than-necessary track heads with spaces between the heads and simultaneously removing side portions of the track heads and parts of the spacers so that equi-spaced track heads of the finally desired width and recesses at the sides of the track heads are formed, and filling the recesses with inlays of non-magnetic material.

This invention relates to multitrack magnetic transducers for recording and reproducing apparatus and more particularly concerns a method of making such a multitrack transducer.

In using recording tape which has a plurality of tracks or channels, the magnetic transducer has a corresponding number of magnetic heads which are aligned across the width of the tape. These multitrack transducers have previously been made by a sandwich technique. This technique involved the manufacture of the individual head structures and the spacers for between the track heads. The spacers give the transverse spacing of track heads below the tracks or channels in the tape. Next, the head structures and spacers were united to give a multitrack transducer. The width of the track heads were required to be correlated to the width for the tracks in the tape. Further, the transverse spacing between track heads necessarily had to be a dimension which corresponded to the desired transverse spacing or pitch of the tracks in the tape. It is apparent that, by separately making the track head structures and spacers and then the sandwich assembling, the dimension variations could be cumulative so that track heads would not correspond with the desired tracks in the tape. Another problem existed in the handling of small width core elements of brittle ferrite and in providing them with the electric coils. It is also apparent that individual manufacture of track heads to precise dimensions involves relatively high fabrication costs.

An object of the present invention is to provide a new improved method of making a multitrack transducer which avoids the above noted disadvantages.

Another object is the provision of such a method whereby a multitrack head is made and has the individual track heads of accurate width and proper pitch.

A further object is to provide such a method of making a multitrack transducer wherein close tolerances as to the width of individually-made track heads is avoided and yet the required width of the track heads is obtained.

An additional object is the provision of such a method of making wherein track heads are simultaneously made to the proper width and pitch (transverse spacing).

A further object is the provision of such a method wherein tracks of substantially excess width are reduced to the proper width and the excess track parts do not interfere with the track heads of the desired width.

An additional object is to provide such a method wherein track heads are reduced to the proper width and the multitrack transducer is made suitable for use with magnetic tape without excess wear.

In accordance with the disclosed embodiment of the invention, the individual track heads are made substantially wider than is finally desired. These heads are combined with spacers to form a subassembly. The intertrack spacers are correspondingly thinner than previously would have been used. This multitrack subassembly has a flat top surface with the nonmagnetic gaps transversely aligned, that is, across the path of the tape. The subassembly is mounted in support structure so that it is encased and so that the flat top surface of the support structure is flush with the transducer subassembly. This multitrack transducer assembly is mounted on a table which is adapted to be elevated and to pass under a grinding wheel. The grinding wheel has a series of precisely formed circumferential recesses and intervening projections. The top of gap structures of the individual heads have their side parts simultaneously removed by the projections so that the residual gap structures are simultaneously formed to the desired transverse width and pitch, matching the recesses in the grinding wheel. The depth of grinding is such that the remaining structure does not interfere with the narrowly-formed track heads. A depth which is greater than the vertical dimension of the gap means will provide this result. After removal by grinding, the grooves or recesses in the transducer assembly are filled with a nonmagnetic material and the transducer assembly is provided with profile for cooperation with tape passing over the gaps.

The realization of the above objects, along with the features and advantages of the invention will be apparent from the following detailed description and the accompanying drawing in which.

Figures 1, 2, 3, 4:
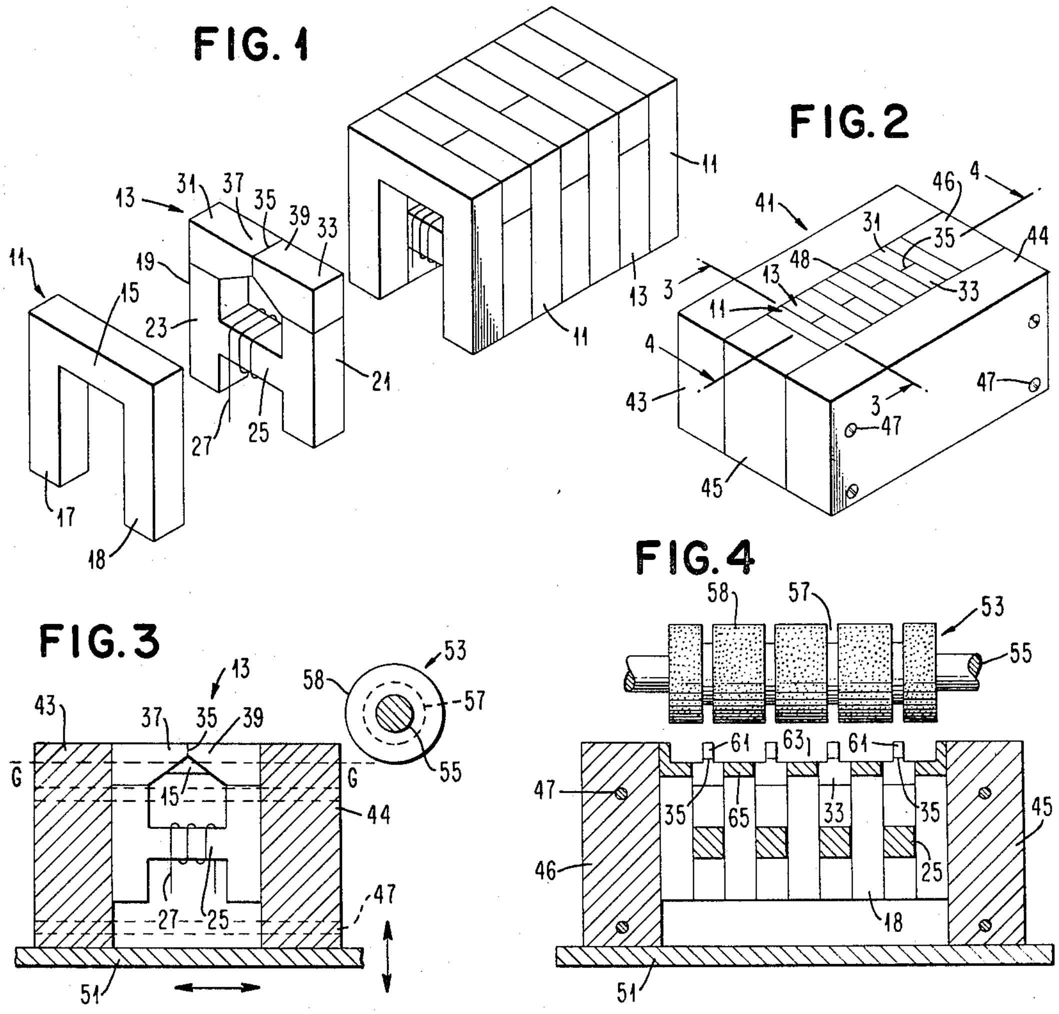
FIGURE 1 is a partially-exploded, perspective view of a subassembly of an alternated series of spacers and track heads.
FIGURE 2 is a perspective view of the FIGURE 1 subassembly mounted in a housing and shows the top surfaces of the spacers and track heads which have nonmagnetic gaps.
FIGURE 3 is an enlarged, partially-cross-sectioned, side view (at plane 3—3) of the FIGURE 2 unit mounted on a table adapted to cooperate with a grinding wheel.
FIGURE 4 is an enlarged partially-cross-sectioned, end view (at plane 4—4) of the FIGURE 2 unit and shows the narrow track heads after the grinding wheel has removed material at the sides of the original track heads.

In FIGURE 1, the fabrication of a subassembly of alternated spacers 11 and track heads 13, which are wider than finally desired, is suggested. The inverted square U-shaped spacers 11 have a top horizontal section 15 with flat upper surface and two downwardly extending legs or vertical sections 17 and 18 having flat sides. Spacers 11 are made from a suitable nonmagnetic material, preferably phosphorus bronze, and serve to space and to shield the track heads. The track heads 13 have a ferrite H-shaped bottom part 19 which includes two vertical sections or legs 21 and 23 and a connecting horizontal cross bar 25. An electrical insulated, copper wire coil 27 is wound on the cross bar 25. Two ferrite pole pieces or sections 31 and 33 are joined by a thin glass bond 35 at the confronting vertical, optically-flat surfaces of the pole ends 37 and 39. The depending parts of the pole pieces 31 and 33 have flat bottom surfaces where the pole pieces 31 and 33 are bonded by epoxy resin adhesive to the flat top surfaces of legs 21 and 23 of the H-shaped part or jumper 19. The pole pieces 31 and 33 have inner surfaces which are inclined upwardly toward each other to the glass bond 35. This bond constitutes a nonmagnetic gap structure. The glass has the approximate thermal coefficient of expansion of the sintered, hard, brittle ferrite of the other parts. It is to be noted that the horizontal section 15 of the spacer (see FIGURE 3) has vertical dimension which is appreciably greater than the height of the gap structure 35 and the adjacent parts of the pole ends 37 and 39.

The track heads 13 constitute one form of apertured magnetic cores which have confronting pole ends separated by nonmagnetic gap structure and also have suitable coils for electro-magnetic energizing or sensing. The spacers 11 and track heads 13 are alternated and aligned to provide flush surfaces, as shown by the rear assembled elements in FIGURE 1. The bond between abutting side surfaces is provided by epoxy resin adhesive. Although the subassembly is shown with four track heads 13 having their gaps transversely aligned, it is to be understood that more, for example, eleven track heads, can be simultaneously treated by the present invention. It is to be noted that the width of the track heads is substantially greater (30 mils) than the finally-desired uniform width (5–10 mils).

In FIGURE 2, the subassembly is shown mounted in an encasing brass housing 41 which is comprised of two transversely-extending rectangular end blocks 43 and 44 and two side rectangular blocks 45 and 46. These blocks are held together by means of four fasteners 47 extending longitudinally. The opening 48 in the housing is slightly larger than the subassembly which is secured in the housing 41 by epoxy resin adhesive whereby a possible adverse effect on the brittle ferrite is avoided since there is no mechanical pressure on the heads 13. It is to be noted that the upper surfaces of the spacers 11 and the track heads 13 are substantially in a common plane and that top surfaces of the housing 41 are substantially flush with this common plane.

In FIGURE 3, the subassembly is shown with a side face of a track head 13 exposed between the sectioned, end blocks 43 and 44. This unit is secured to a table 51 by suitable means, such as fixtures (not shown) or cement. Table 51 is adapted to be moved vertically and longitudinally as suggested by the double-headed arrows, in relation to a vitrified, silicon carbide grinding wheel 53 mounted on shaft 55. The cylindrical grinding wheel is dressed and recessed by crush forming with a hard steel roller having projections to form the circumferential recesses 57 in the wheel end cylindrical grinding surfaces 58. The multitrack transducer assembly is moved relative the grinding wheel so that nonrecessed cylindrical surfaces 58 remove material above the dashed line G—G. It is to be noted that the vertical dimension of spacer top section 15 (appearing below the gap 35) is appreciably greater than the height of the gap 35 and the adjacent parts of the confronting pole ends 37 and 39. It is also to be noted that preferred depth of the grinding is greater than the vertical gap dimension and that a residual part of the top section 15 of the spacer will remain at the bottom of the ground-out recess after grinding to the plane G—G.

In FIGURE 4, a cross-sectioned, transverse view of the transducer and the working surface of the grinding wheel 53 shows the result after grinding. The grinding wheel 53 has four equispaced recesses 57 and cylindrical grinding surfaces 58. The grinding surfaces 58 at the sides are somewhat narrower than the surfaces between the recesses. It is apparent that the grinding has simultaneously removed side portions of the pole ends of the track heads and portions of the top sections of the spacers so that equispaced track heads 61 of the finally-desired width and recesses 63 at the sides of the track heads are formed. As shown, the depth of the grinding is such as to entirely remove the side portions of the track heads adjacent the gap 35. It is to be understood that the depth of the rectangular recesses 63 can be less provided that the functional gap portion does not receive interference from the residual structure after shielding. The residual top section of the spacer, in any event, provides a recess bottom wall 65 which extends transversely from the sides of the original-width pole end parts. When it is desired to make the track heads of brittle ferrite and the finally-desired uniform width of the gap portions is in the range of 5–10 mils, the original width is about 30 mils. The advantage over forming and handling 7-mil thick heads, for example, is apparent. Further, the desired equal spacing or pitch of the rectangular heads is accurately and simultaneously realized and the avoidance of precise dimensions in assembled parts results.

Figures 5, 6:
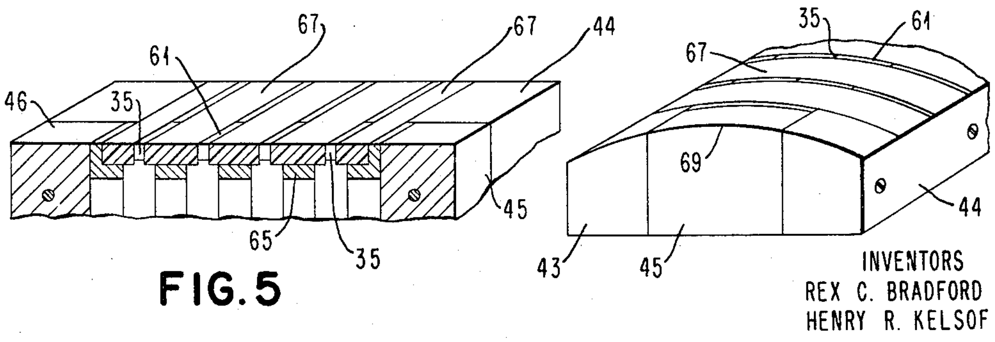
FIGURE 5 is a broken-away, cross-sectioned, perspective view of the top part of the unit and shows filler material in the recesses formed by the grinding wheel.
FIGURE 6 is a broken-away, perspective view of part of the top of the multitrack transducer and shows the curved, longitudinal profile after transverse grinding.

In FIGURE 5, the step of filling the recesses with inlays 67 of nonmagnetic material which has wear characteristics approximating the wear characteristics of the track head is shown as completed. As preferred, inlays or strips of phosphorous bronze are bonded by means of epoxy resin adhesive to the metallic and ferrite walls of the recesses. Other suitable materials, such as brass, can be cemented in the recesses or epoxy resin can be solidified in the recesses. It is to be noted that, since a flush-top surface housing was used with the subassembly, recesses were formed therein and the inlays extended into the housing recesses.

In FIGURE 6, the transducer is shown as it has been contoured after the step of filling the recesses. A convex surface 69 is formed by grinding transversely the upper part. The convex surface extends longitudinally and is centered at the transversely-spaced gap structures 35. It is to be noted that the finally-narrow-dimensioned track heads or gapped-pole ends 61 necessarily have longitudinally aligned sides and thus the problem of longitudinally aligning narrow pole ends is avoided. This advantage and width dimensioning would also result when other magnetic materials (nickel-iron alloy) are used.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The method of making a multitrack magnetic transducing unit comprising:

providing a subassembly having a plurality of spaced track heads and spacers extending between the heads, each of said track heads including an apertured magnetic core having confronting pole ends separated by nonmagnetic gap means and an electric wire coil mounted on the core, each of said track heads having a width which is substantially greater than the finally-desired width, said spacers being made of nonmagnetic material and having top sections which respectively extend between the sides of the pole ends of the core, simultaneously removing side portions of the pole ends of said track heads and portions of the top sections of said spacers so that equispaced track heads of the finally-desired width and recesses at the sides of the track heads are formed, and filling said recesses with inlays of nonmagnetic material which has wear characteristics approximating the wear characteristics of the track heads.

2. The method according to claim 1 and being further characterized by:

said step of simultaneously removing being done by means of a grinding wheel having equispaced circumferential recesses of rectangular cross section.

3. The method according to claim 2 and being further characterized by:

said track heads being made from a hard, brittle ferrite and said grinding wheel being made from vitrified silicon carbide.

4. The method according to claim 2 and being further characterized by:

said step of filling said recesses being done by bonding with epoxy resin adhesive metallic strips in the recesses.

5. The method according to claim 2 and being further characterized by:

said removing by a grinding wheel being such that the side portions of the pole ends of the track heads are completely removed for a dimension extending significantly from the gap means.

6. The method of making a multitrack magnetic transducer head comprising:

providing a subassembly having a plurality of spacers and track heads alternately arranged with a spacer at each side of the subassembly, each of said track heads having a width which is substantially greater than the finally-desired width for the track heads, said spacers having a top section which has a flat upper surface, said track heads having a flat upper surface formed by two pole sections separated by nonmagnetic gap structure, the upper surfaces of the top sections of said spacers and track heads being substantially in a common plane, mounting said subassembly in an encasing housing, providing a cylindrical grinding wheel having circumferential recesses of rectangular cross section which correspond in number to the plurality of track heads and which are dimensioned and spaced to reduce the track heads to a desired width and equispacing, using said grinding wheel to remove side portions of the pole sections of said track heads and portions of the top sections of said spacers so that equispaced track heads of the finally-desired width and recesses at the sides of the track heads are formed, and filling said recesses with inlays of nonmagnetic material which has wear characteristics approximating the wear characteristics of the track heads.

7. The method of making according to claim 6 and being further characterized by:

said track heads being made from a hard, brittle ferrite and having an initial width of about 30 mils, said grinding wheel recesses being dimensioned so that the track heads are reduced to a uniform width in the range of 5–10 mils.

8. The method of making according to claim 6 and being further characterized by:

said top sections of said spacers having a vertical dimension substantially greater than the track head pole sections adjacent the gap structure, and said step of using the grinding wheel being such that the side portions of the pole sections adjacent the gap structure are removed while parts of the top sections of the spacers remain to form bottom walls for the recesses.

9. The method of making according to claim 6 and being further characterized by:

said housing having a top surface which is flush with the upper surfaces of the track heads and spacers to give a flat top surface so that the recesses extend through the housing when the grinding wheel is used, and forming the upper part of the transducer head, after said step of filling recesses, into a convex surface which extends longitudinally and is centered at the transversely-spaced gap structures.

References Cited

UNITED STATES PATENTS

| | | | |
|---|---|---|---|
| 3,082,509 | 3/1963 | Lawrance | 29—603 |
| 3,224,073 | 12/1965 | Peloschek | 29—603 |
| 3,145,452 | 8/1964 | Camras | 29—603 |
| 3,246,383 | 4/1966 | Peloschek et al. | 29—603 |
| 3,283,396 | 11/1966 | Pfost | 29—603 |
| 3,319,232 | 5/1967 | Crownover | 29—604 |
| 3,330,033 | 7/1967 | Manders et al. | 29—603 |

JOHN F. CAMPBELL, *Primary Examiner.*

D. C. REILEY, *Assistant Examiner.*